United States Patent [19]

Mattei et al.

[11] Patent Number: 4,660,578

[45] Date of Patent: Apr. 28, 1987

[54] PIERCING DEVICE FOR PIERCING VENTILATING HOLES IN CIGARETTES OR SIMILAR SMOKING COMMODITIES

[75] Inventors: Riccardo Mattei; Armando Neri, both of Bologna; Santo R. Gobbi, Pavia; Maichi Cantello, Aglié, all of Italy

[73] Assignee: G.D. Societa Per Azioni, Bologna, Italy

[21] Appl. No.: 649,277

[22] Filed: Sep. 10, 1984

[30] Foreign Application Priority Data

Sep. 12, 1983 [IT] Italy .................................. 3557 A/83

[51] Int. Cl.[4] .............................................. A24C 5/60
[52] U.S. Cl. .................................................... 131/281
[58] Field of Search ........................................ 131/281

[56] References Cited

U.S. PATENT DOCUMENTS 4,524,784  6/1985  Seragnoli et al. .................... 131/281

Primary Examiner—V. Millin
Attorney, Agent, or Firm—Frost & Jacobs

[57] ABSTRACT

A piercing device for piercing holes in cigarettes or similar smoking commodities, in which a laser beam emitted by a continuous laser source is directed, by a mobile reflecting and focusing unit, mounted in a rotary manner around an axis. A fixed reflecting member is arranged on the axis and the beam is reflected, on to each cigarette for piercing, the latter being arranged essentially coaxial with the axis and being carried crosswise in relation to it on a rotary drum. The mobile unit receives the laser beam in a direction coaxial with the axis and diverts it first outwards and then inwards to a fixed point on the axis. The focused beam is diverted on to each cigarette by the fixed reflecting member which is provided with two rings of fixed mirrors.

4 Claims, 2 Drawing Figures

PIERCING DEVICE FOR PIERCING VENTILATING HOLES IN CIGARETTES OR SIMILAR SMOKING COMMODITIES

BACKGROUND OF THE INVENTION

The present invention relates to a piercing device for piercing ventilating holes in cigarettes or similar smoking commodities.

For making so-called "ventilated" cigarettes, piercing devices are known to be employed on which the piercing "tool" consists of a laser source. On known types of laser beam piercing devices, cigarettes are generally pierced according to two techniques, the first technique uses a laser source which pierces the ventilating holes in the cigarettes as they turn round their own axis, and the second technique uses mobile reflecting systems designed to divert the laser beam on to the cigarette being pierced in different directions, while the cigarette travels in relation to the source without turning around its own axis.

In both the above cases, known types of laser beam devices use a "pulsating" laser source, the frequency of which is sufficient to pierce a hole for each pulse.

The employment of a pulsating laser source, however, makes it practically impossible for the above known types of piercing devices to be used in conjunction with high-output cigarette manufacturing or filter assembly machines designed for producing as many as 10,000 cigarettes a minute.

For this to be done, the pulse frequency required for piercing about thirty holes in each cigarette is around 5,000 Hz, which means using relatively large, high-power laser sources. Furthermore, such pulse frequencies usually result in irregular, drawn-out holes of unacceptable appearance.

SUMMARY OF THE INVENTION

The aim of the present invention is to provide a laser beam piercing device designed to operate smoothly in conjunction with high-output cigarette manufacturing and filter assembly machines and which involves none of the above-mentioned drawbacks.

With this aim in view, the present invention relates to a piercing device for piercing ventilating holes in cigarettes or similar smoking commodities supported on a feeding device. The piercing device comprises a laser source and an optical reflecting and focusing system designed to divert the beam emitted by the source and focus it in succession on specific points on the surface of each cigarette or smoking commodity. The device is characterised by the fact that the source is designed to emit a continuous laser beam along a fixed axis parallel with the axes of the cigarettes or smoking commodity and coinciding with the axis of the cigarettes, in succession, with each cigarette when each cigarette or smoking commodity moves into a given position on the piercing arc. The optical system comprises a mobile unit, turning around the fixed axis and designed to focus the beam on a fixed point of the fixed axis. A fixed reflecting member is set up between the mobile unit and the fixed point and comprising a number of reflecting elements designed to be swept in succession by the focused beam.

BRIEF DESCRIPTION OF THE DRAWINGS

Further characteristics and advantages of the present invention will now be described with reference to the attached drawings showing a non-limiting example and in which.

DETAILED DESCRIPTION OF THE INVENTION

Figure 1:
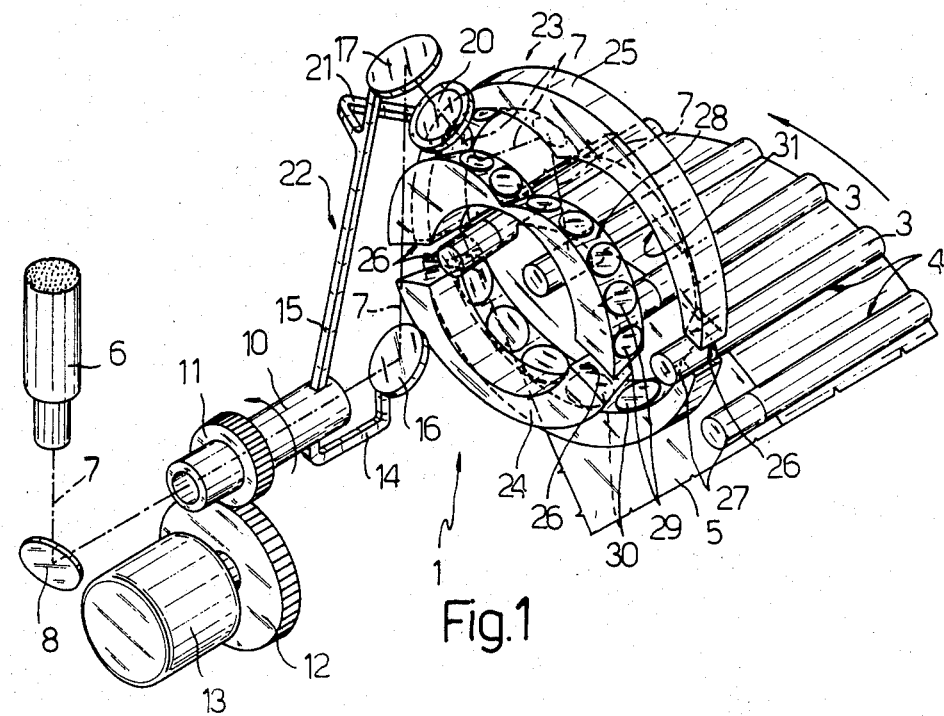
FIG. 1 shows a perspective view of a preferred arrangement of the piercing device according to the present invention.

Number 1 in FIG. 1 indicates a piercing device designed to pierce a ring of holes 2 (FIG. 2) in a number of cigarettes 3. Each of the latter is partially housed in fixed position inside a seat 4 on the periphery of a feeding device comprising a drum 5 designed to turn round its own axis at a given constant speed. Device 1 comprises a continuous laser source 6 designed to emit a continuous beam 7 refleced by a fixed mirror 8 along an axis 9 parallel to the axis of rotation of drum 5 and coinciding, as shown in FIG. 2, with the position assumed by the axis of each cigarette 3 when the latter reaches the centre line of a piercing arc corresponding to the circular distance travelled by cigarettes 3 on drum 5 and along which holes 2 are pierced.

Device 1 also comprises a tubular body 10 mounted so as to turn round its own axis coinciding with axis 9. Tubular body 10 is provided with an outer ring 11 engaging with drive means consisting of an output pinion 12 on motor 13 designed to drive body 10 at a given constant speed.

From the end of body 10 facing drum 5 extend two arms, 14 and 15, supporting respective mirrors, 16 and 17, the former of which is designed to intercept the beam 7 from body 10 and divert it outwards on to mirror 17 in a direction essentially perpendicular to axis 9.

Figure 2:
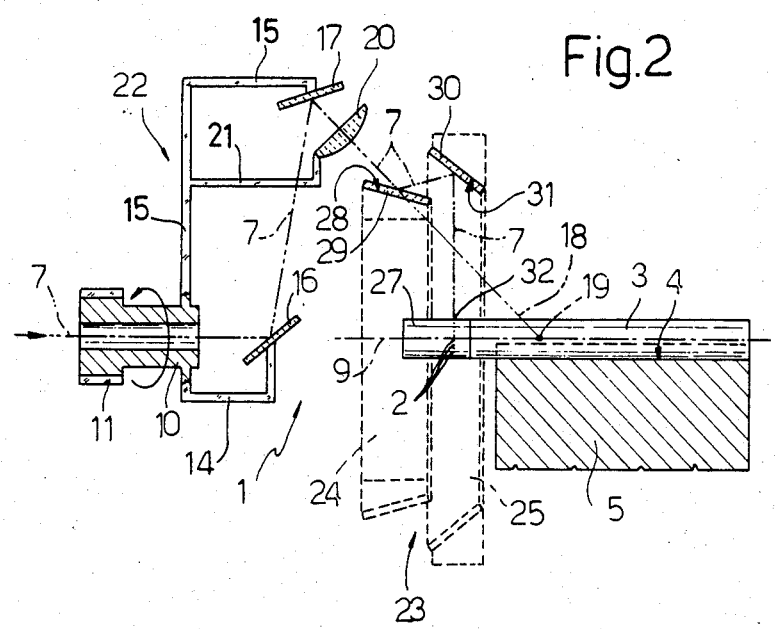
FIG. 2 shows a cross-sectional side view of the FIG. 1 device.

As shown in FIG. 2, mirror 17 is positioned so as to divert beam 7 along axis 18 intersecting axis 9 at point 19. Axis 18 coincides with the optical axis of focusing lens 20 supported on arm 21 integral with arm 15. The lens 20 is designed to focus beam 7 on a point which, if the focused beam was not diverted further, would coincide with point 19, regardless of the angular position assumed around axis 9 by mobile unit 22, comprising tubular body 10, arms 14, 15 and 21, mirrors 16 and 17, and lens 20.

Device 1 also comprises a fixed reflecting member 23 consisting of two rings 24 and 25 essentially coaxial with axis 9. Each ring 24 and 25 is divided into two parts by two slots 26 to allow for the passage of filters 27 on cigarettes 3 projecting from drum 5.

Along the outer surface 28 of ring 24 is arranged a first number of reflecting elements, consisting of mirrors 29, equal in number to the number of holes 2. Each mirror 29 is positioned so as to intercept focused beam 7 from lens 20, for a given range of angular positions assumed by mobile unit 22 round axis 9, and reflect it on to a corresponding reflecting element consisting of a mirror 30 on the inner surface 31 of ring 25.

Each mirror 30 is positioned so as to divert focused beam 7, reflected by the corresonding mirror 29, in a direction essentially perpendicular to axis 9. As shown in FIG. 2, the shape of surfaces 28 and 31 is designed so that the focus 32 of reflected beam 7 is maintained on the outer surface of filter 27 being pierced.

For a better understanding of how piercing device 1 operates, it should be pointed out that, according to a known law of physics, if a beam of light is focused on one point which remains stationary in space regardless of the movement of the focusing device along a given trajectory, any deflection of the focused beam of light will result in the creation of a new focus which, like the original focus, will remain stationary in space alongside a change in the position of the focusing device.

Now, examining device 1 in light of this principle and considering that, without mirrors 29 and 30, beam 7 is always focused on fixed point 19, it follows that, by inserting a pair of mirrors, 29 and 30, beam 7 is focused on point 32, which remains stationary in space for as long as it takes beam 7 to sweep the mirrors 29 and 30. Then drum 5 rotates a new cigarette into position, forming a new fixed point 32, and beam 7 begins to sweep the new cigarette with the pair of mirrors 29 and 30. Consequently, if each cigarette 3 was to remain stationary with its axis aligned with axis 9 for as long as it takes to be pierced, i.e. for as long as it takes mobile unit 22 to make a full turn round axis 9, device 1 would be capable of piercing a ring of n number of essentially perfect holes around the edge of filter 27, wherein n is the number of pairs of corresponding mirrors 29 and 30. These ideal conditions, however, do not exist in real practice, owing to the fact that, during the piercing time, the cigarette 3 being pierced is carried by drum 5 over a piercing arc extending over axis 9 and the length of which corresponds to the distance between two adjacent cigarettes 3.

Consequently, only those holes 2 pierced by beam 7 positioned essentially tangent with the drum 5 are essentially perfect, whereas the other holes 2 will be oval-shaped. The oval effect, though still extremely limited, is dependent on the extent to which incident beam 7 is radial in relation to drum 5.

Nevertheless, it should be pointed out that the above-mentioned results are obtained using a continuous and not a pulsating laser source 6, the beam 7 being "pulsated", not at the source, but by reflecting member 23, thus providing for considerable saving in energy and a drastic reduction in the size of source 6.

We claim:

1. A piercing device for piercing ventilating holes in the surface of cigarettes, the device comprising:
   a feeding device for supporting a roll of equally spaced cigarettes arranged parallel to each other in a side-by-side relationship;
   means for advancing said feeding device thus advancing said cigarettes transversely of their axis along a predetermined arc;
   a laser source for emitting a laser beam in a continuous manner along a fixed axis coinciding, in succession during use, with the axis of each cigarette as it reaches a predetermined position along said arc; and
   an optical reflecting and focusing system to divert and focus said beam in succession on predetermined points of the surface of each cigarette being advanced, in use, along said arc by said feeding device, said optical system comprising a mobile focusing unit mounted for rotation about said fixed axis to focus said beam on a fixed point of said axis, and a fixed reflecting member mounted between said focusing unit and said fixed point and comprising a number of reflectng elements designed to be swept in succession by said focus beam.

2. A device as claimed in claim 1, wherein said reflecting member comprises first and second rings arranged about said fixed axis, and said reflecting elements comprises a plurality of first mirrors supported by said first ring and a plurality of second mirrors supported by said second ring; said first mirrors being equal in number to said second mirrors; each of said first mirrors being oriented to divert an impinging focused laser beam onto a corresponding said second mirror; and each said second mirror being oriented to divert an impinging focused laser beam in a substantially radially direction relative to said fixed axis.

3. A device as claimed in claim 1, wherein said mobile focusing unit comprises first and second mirrors, said first mirror is arranged on said fixed axis to divert said laser beam outwards to impinge onto said second mirror, said second mirror being arranged so as to divert said impinging laser beam so that said laser beam intersects said fixed axis at said fixed point; and a focusing lens arranged between said second mirror and said fixed point to focus said laser beam on said fixed point.

4. A device as claimed in claim 1, wherein said arc is equal in length to the distance between adjacent cigarettes on said feeding device; said mobile focusing unit comprises drive means to cause said focusing unit to perform a complete rotation about said fixed axis in a time period equal to the time of travel of each cigarette, in use, along said arc.

* * * * *